United States Patent
Tokairin et al.

(10) Patent No.: US 7,427,171 B2
(45) Date of Patent: Sep. 23, 2008

(54) PRESSURE VESSEL FORMED BY JOINING TWO MEMBERS MADE OF DIFFERENT MATERIALS

(75) Inventors: Akira Tokairin, Hitachinaka (JP); Katsumi Ose, Hitachinaka (JP); Ryo Tominaga, Hitachinaka (JP); Hiroshi Nagasaka, Tokyo (JP); Naoki Yoshida, Tokyo (JP); Akihisa Inoue, 11-806, Kawauchi Jutaku, 35, Kawauchi Motohasekura, Aoba-ku, Sendai-shi, Miyagi-ken (JP)

(73) Assignees: Aoyama Seisakusho Ibaraki Plant Co., Ltd., Ibaraki-Ken (JP); Nagano Keiki Co., Ltd., Tokyo (JP); Akihisa Inoue, Miyagi-ken (JP)

( * ) Notice: Subject to any disclaimer, the term of this patent is extended or adjusted under 35 U.S.C. 154(b) by 53 days.

(21) Appl. No.: 10/947,165

(22) Filed: Sep. 23, 2004

(65) Prior Publication Data

US 2005/0067831 A1     Mar. 31, 2005

(30) Foreign Application Priority Data

Sep. 25, 2003    (JP)    ............... 2003-334177

(51) Int. Cl.
- *B25G 3/28* (2006.01)
- *F16B 12/24* (2006.01)
- *F16G 11/00* (2006.01)

(52) U.S. Cl. .................. 403/276; 220/789; 220/801; 403/282

(58) Field of Classification Search ................ 403/274, 403/278, 279, 280, 282, 276; 29/890.12, 29/890.132, 890.14, 890.941, 890.141; 220/801, 220/789, 784; 215/355

See application file for complete search history.

(56) References Cited

U.S. PATENT DOCUMENTS

| | | | | |
|---|---|---|---|---|
| 4,867,333 A | * | 9/1989 | Kolp et al. ................... | 220/234 |
| 5,665,921 A | * | 9/1997 | Gerst et al. ................... | 73/715 |
| 6,390,720 B1 | * | 5/2002 | LeBegue et al. ............ | 403/279 |
| 6,557,788 B1 | * | 5/2003 | Huang ........................ | 239/600 |

FOREIGN PATENT DOCUMENTS

| | | |
|---|---|---|
| JP | 61-42444 | 2/1986 |
| JP | 9-318480 | 12/1997 |

\* cited by examiner

*Primary Examiner*—Daniel P. Stodola
*Assistant Examiner*—Nahid Amiri
(74) *Attorney, Agent, or Firm*—Wenderoth, Lind & Ponack, L.L.P.

(57) ABSTRACT

A cylindrical joining member is fitted into a member to be joined that is made of a material different from the joining member. Plastic deformation is effected in a soft material of the member to be joined to hermetically join the two members together. Joining faces are provided to the two members that face and are joined to each other by the plastic deformation and with an elastic deformation pressure in an axial direction. The soft material of the member to be joined, which is located in a circumferential direction of the member, bites into a joining portion of the joining member by the plastic deformation and with the elastic deformation pressure.

28 Claims, 2 Drawing Sheets

PRESSURE VESSEL FORMED BY JOINING TWO MEMBERS MADE OF DIFFERENT MATERIALS

BACKGROUND OF THE INVENTION

1. Field of the Invention

The present invention relates to a pressure vessel formed by joining two members made of different materials. The pressure vessel can be suitably used, for example when a cylindrical member formed with a diaphragm is joined with another member so as to constitute a pressure vessel, in a pressure sensor element, which detects a pressure of a fluid by using a diaphragm.

2. Description of the Related Art

It has been widely known to effect plastic deformation joining of two members made of a metal and a non-metal respectively, or two metals, by causing one member made of metal to undergo plastic deformation locally for fitting into the joining groove provided in the other member (refer to JP 61-042444 A, for example).

JP 61-042444 A discloses a method of joining a clutch cone and a transmission gear. Circular grooves for effecting the plastic deformation joining are formed in an inner peripheral surface of a clutch cone. After the clutch cone is press fitted into the transmission gear, a second punch is press fitted into a position in the vicinity of the joining face of the transmission gear. A portion of the transmission gear is plastically deformed toward the clutch cone to join the transmission gear and the clutch cone together.

Further, though not described in the specification of JP 61-042444 A, FIGS. 1 to 6 of JP 61-042444 A show a joggled face provided in the transmission gear, by use of which positioning in an axial direction is performed when the clutch cone is press fitted into the transmission gear.

Further, JP 09-318480 A discloses a pressure sensor in which a cylindrical component formed with a diaphragm is hermetically held in a pressure vessel by means of an O ring mounted to the cylindrical component.

According to the joining method of metallic members disclosed in JP 61-042444 A described above, the plastic deformation is sufficiently effected with a small pressurizing force, and two metallic members are joined together with high joining strength and high precision. However, the joining method of metallic members disclosed in JP 61-042444 A mainly deals with joining in a rotational direction. It does not attach much importance to hermeticity between the two members.

On the other hand, in the pressure sensor disclosed in JP 09-318480 A, hermeticity between the cylindrical component and the pressure vessel is taken into consideration, but it does not deal with joining of two members by plastic deformation.

In general, pressure sensors themselves are used for a variety of purposes. It is preferable that they can withstand the uses under any environment, and they must be strong against changes over time. Considering the above, the O ring is not necessarily the ideal solution.

Meanwhile, welding by irradiation with a laser beam is known as a joining means for joining a diaphragm element to a mounting pedestal. SUS 630 is used for the diaphragm element as a pressure sensor, and SUS 430 is used for the mounting pedestal. Metallic glass has recently drawn attention as a material having a low Young's modulus and high breaking strength. When metallic glass is used for the diaphragm element, and the diaphragm element is joined with the mounting pedestal by welding through laser beam irradiation, the following problems arise: No matter how short the time for irradiation with the laser beam is, the welding portion reaches a melting temperature. The welding portion reaches the crystallization temperature of the metallic glass to crystallize the metallic glass. The diaphragm may deteriorate in its performance, or may be broken, which becomes an obstacle to practical application.

Furthermore, the pressure sensor needs to function as a pressure vessel as well. Needless to say, joining force between the members should be improved. If there is a leak of fluid from a fitting portion of the diaphragm including a joint portion due to an increase in pressure within the pressure sensor, this will become a problem. Accordingly, it is desirable in the pressure sensor that the joining force between members be improved, and hermeticity of the pressure sensor as a product be permanently kept within a passing range, at a leak rate of $9.9\times10^{-10}$ atm·cc/sec. or less

SUMMARY OF THE INVENTION

It is an object of the present invention to provide a pressure vessel formed by joining two members made of different materials, which realizes high joining precision and high hermeticity.

To attain the above-mentioned objects according to the present invention, there is provided a pressure vessel having a joint structure of two members made of different materials, the hermetical joint structure being formed by fitting a cylindrical cup-shaped member into a cylindrical outer member and by subjecting a first member of softer material of the two members to plastic deformation to hermetically join the two members.

The two members include joining faces that face and hermetically contact each other in an axial direction by local plastic deformation and with an elastic deformation pressure when the joining member is fitted into the member to be joined. A part of the first soft material member which is provided in a circumferential direction of the member bites into a joining portion of the second, harder member by local plastic deformation and with elastic deformation pressure.

According to the present invention, it is preferable that one of the joining faces be formed on a joggled face of the second member.

According to the present invention, it is preferable that the joining faces be joined together by the elastic deformation pressure applied from both sides in the axial direction.

According to the present invention, it is preferable that the second member include an annular projection formed on an end face in the axial direction, and that the end face serve as the other joining face.

According to the present invention, it is preferable that the second member include a plurality of protrusions that are formed annularly.

According to the present invention, it is preferable that the annular protrusion be formed at a position in a vicinity of an inner diameter portion of the cylindrical second member.

To attain the above-mentioned objects, according to the present invention, there is provided a pressure vessel formed by joining two members made of different materials, the hermetical joint structure being formed by fitting a cylindrical cup-shaped member into a cylindrical outer member and by subjecting a first member of softer material of the two members to plastic deformation to achieve the hermetical joint structure therebetween. The joining member is inserted and fitted into the member to be joined, and an inner circumferential end face of the member to be joined which comes into contact with the joining member is pressed from an axial direction while a joining pressure is applied to between the two members to be joined, to locally effect plastic deformation in the inner circumferential end face, whereby achieving hermetical joining of the two members by plastic deformation and elastic deformation pressure.

As described above, according to the present invention, there is provided a pressure vessel of two members made of different materials which realizes high joining precision and high hermeticity. The hermetical joint structure of the present invention is formed by fitting a cylindrical joining member into a member to be joined and by subjecting the softer material member of the two members to plastic deformation to hermetically join the two members. The two members include joining faces that hermetically face and contact each other in an axial direction by local plastic deformation and with an elastic deformation pressure when the joining member is fitted into the member to be joined; and a part of the one soft material member which is provided in a circumferential direction of the member, bites into a joining portion of the harder joining member by local plastic deformation and with elastic deformation pressure. As a result, hermetical joining of the two members can be achieved.

Further, according to the present invention, the cup-shaped member is inserted and fitted into the outer cylindrical member and while applying a joining pressure to the two members, the inner circumferential end face of the member to be joined which comes into contact with the joining member is pressed from the axial direction to locally effect the plastic deformation in the inner circumferential end face. As a result, it is possible to provide a method of hermetically joining two members made of different materials to form a pressure vessel, which enables easy assembly and achieves high hermeticity.

DESCRIPTION OF THE PREFERRED EMBODIMENTS

Figure 1:
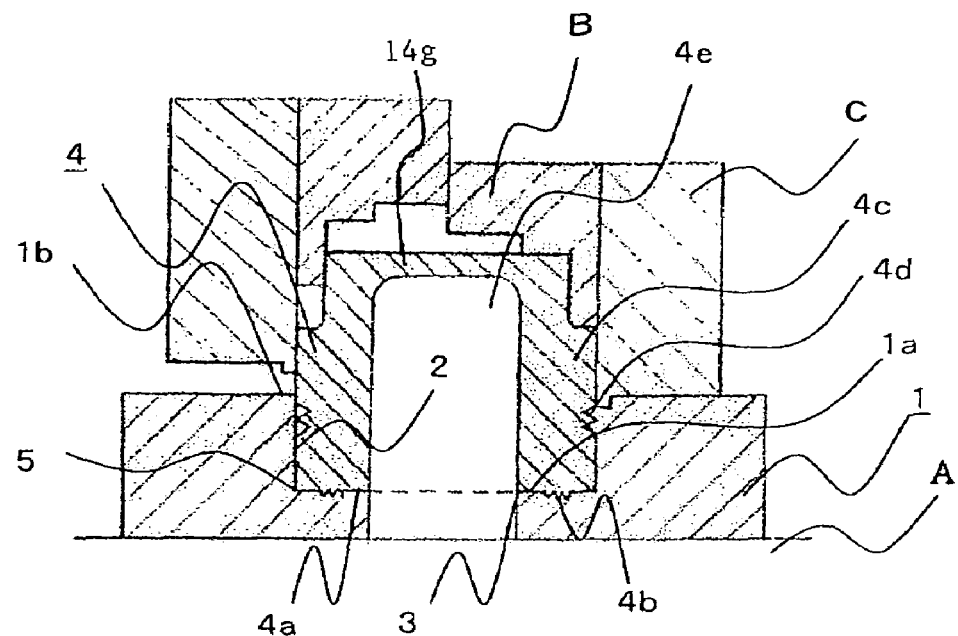
FIG. 1 is a cross sectional view showing a joint structure of a cylindrical member and a mounting pedestal in a pressure sensor according to a first embodiment of the present invention.

It is an object of the present invention to provide a pressure vessel having a hermetical joint structure of two members made of different materials, which realizes high joining precision and high hermeticity. To achieve the objects of the invention, a joining member (hereinafter referred to as the "second member") is joined to the member to be joined (hereinafter referred to as the "first member"). The second member and the first member are made of different materials. The second member and the first member have joining faces where the two members are joined to each other in an axial direction by plastic deformation and with an elastic deformation pressure. A soft material of the first member that is provided in a circumferential direction of the member, bites into the second member with a local elastic deformation pressure, suppressing the elastic deformation pressure in the axial direction.

First Embodiment

Hereinafter, embodiments of the present invention are described based on examples of hermetical joint structures in a pressure sensor shown in the drawings.

FIG. 1 shows a pressure vessel according to a first embodiment of the present invention.

In FIG. 1, a mounting pedestal 1, which is a first member, is a disc member made of metal (SUS material) and constitutes a pressure vessel. A countersunk hole 2 is provided in a central portion of the mounting pedestal 1 to form a joggled face. A through-hole 3 is formed in a central portion of the countersunk hole 2.

Figure 2:
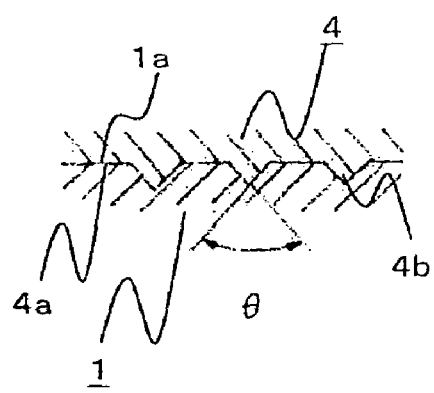
FIG. 2 is a main portion enlarged view that illustrates joining in an axial direction in the joint structure of FIG. 1.

A cylindrical member 4 of a pressure sensor element (cup-like configuration) which is a second member is fitted into the countersunk hole 2. The forward end of the cylindrical member 4 is closed by a diaphragm 14g. The cylindrical member 4 is made of a crystalline material or an amorphous material. A joining face 4a at the other end of the cylindrical member 4 and a bottom face 1a of the mounting pedestal 1 face each other and are hermetically joined together by plastic deformation and with elastic deformation pressure produced at a joint portion 5. As shown in FIG. 2, plural annular protrusions 4b are formed in advance on the joining face 4a, and contribute to intimate joining of the two members. Empirical examination shows that two or three annular protrusions 4b are sufficient, and they preferably have a height of 0.1 mm to 0.15 mm, and a tilt angle of 60° to 90°.

It is preferable that the annular protrusions 4b be provided at a position in the vicinity of an inner diameter portion of the cylindrical member 4 as a second member so that a load applied by pressure to the second member may be as small as possible.

Figure 3:
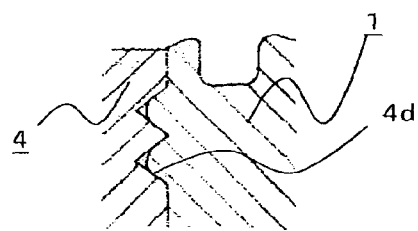
FIG. 3 is a main portion enlarged view that illustrates joining in a radial direction in the joint structure of FIG. 1.

As shown in FIG. 3, annular joining grooves 4d having a cross section of a W-shape are formed on an outer circumference of a cylindrical portion 4c of the pressure sensor element. The annular joining grooves 4d permits a material of an opening peripheral edge portion 1b of the mounting pedestal 1 to undergo plastic deformation locally, thereby maintaining the joining in an axial direction. Further, a pressure introduction hole 4e of the cylindrical member 4 is arranged so as to be concentric with, and communicate with, the through-hole 3 of the mounting pedestal 1.

Next, a joining method is described.

The mounting pedestal 1 is mounted on a die A, and the cylindrical member 4 is fitted into the countersunk hole 2 to be placed on the joggled face. After that, a pressure die B is pressed against the cylindrical member 4 from above of FIG. 1. Then, the annular protrusions 4b of the cylindrical member 4 cut into the joggled face 1a of the mounting pedestal 1, and the two members are joined together by plastic deformation and with elastic deformation pressure. If the pressure die B were released in that state, the joint portion would be released by spring back and a gap would be produced. To prevent this, while maintaining the pressing with the pressure die B, a joining punch C is lowered concentrically with the cylindrical member 4 along the cylindrical portion 4c, vertically pressing the opening peripheral edge portion 1b of the mounting pedestal 1. The material of the opening peripheral edge portion 1b undergoes local plastic deformation in a direction perpendicular to the pressing direction, thereby maintaining the joining in an axial direction.

When a metal and a brittle material (ceramic) are joined together as in the present invention, there is a fear in that the brittle material may be damaged. However, in the present invention, there is no such fear because a metallic member that can readily undergo the plastic deformation is locally pressed, and because only a small volume thereof is plastically deformed for fitting into the joining grooves 4d.

Further, at the joint portion 5, the plural annular joining protrusions 4b, which have a height of 0.1 mm to 0.15 mm and a tilt angle of 60° to 90°, are formed in the joining face 4a as described above. The protrusions 4b cut into the mounting pedestal 1 while effecting local plastic deformation in the mounting pedestal 1, and maintain that state with the elastic deformation pressure. Thus, the two members are hermetically joined together without fail.

It is preferable that the joining protrusions 4b be annular considering formability and joinability. However, use of spiral or conical protrusions or, in some cases, even a rough surface may be effective. It is preferable that different types of protrusions be chosen or combined as appropriate according to the conditions for application.

When such a structure is applied to a pressure sensor, it is possible to guarantee a maximum detection pressure of no less than 180 MPa owing to improvement in a joining force between the two members. As for a leakage of air from the fitting portion of the cylindrical member including the joint portion, it is possible to permanently keep the hermeticity of the pressure sensor as a product within a passing range of $9.9 \times 10^{-10}$ atm·cc/sec. or less.

Further, the annular protrusions 4b in the joining face 4a are provided at the position in the vicinity of the inner diameter portion of the cylindrical member 4. Thus, the distance to the joint portion can be made smaller, and the load applied to the cylindrical member 4 via a gap can be made as small as possible. It is thus possible to obtain a device that is small and has high pressure resistance.

Second Embodiment

Figure 4:
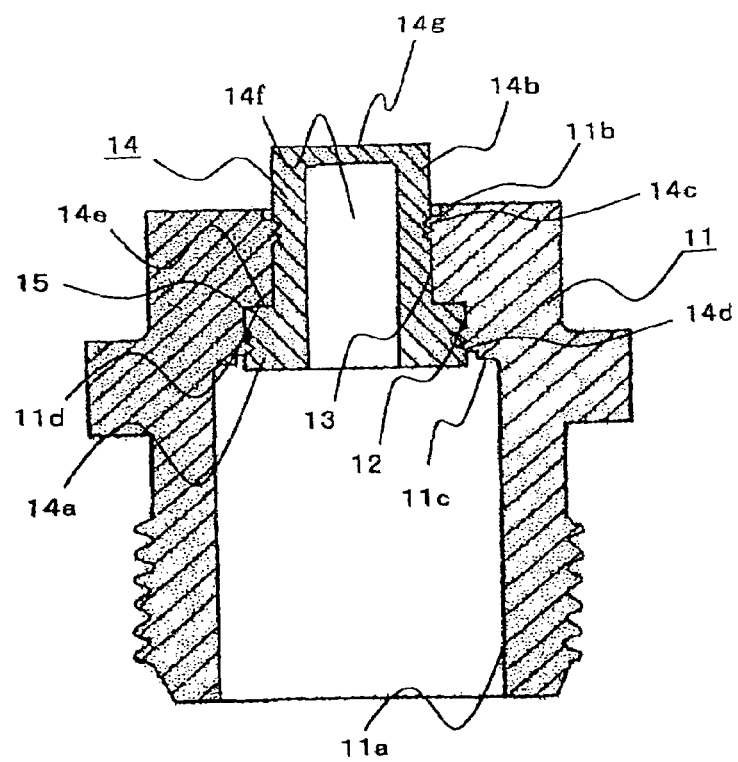
FIG. 4 is a cross sectional view showing a joint structure of a cylindrical member and a mounting pedestal in a pressure sensor according to a second embodiment of the present invention.

FIG. 4 shows a hermetical joint structure according to a second embodiment of the present invention.

In FIG. 4, a mounting pedestal 11 (housing), which is a first member, is a cylindrical member made of metal (SUS material) like the mounting pedestal 1 in the first embodiment. A through-hole 13 including a countersunk hole 12 is provided in the central portion of the mounting pedestal 11. An insertion hole 11a for inserting a cylindrical member 14 is provided so as to communicate with the countersunk hole 12. The insertion hole 11a is concentric with the through-hole 13 and has a larger diameter than the countersunk hole 12.

The cylindrical member 14 has a flange portion 14a. The cylindrical member 14 is inserted from the side of the insertion hole 11a. The flange portion 14a is fitted into the countersunk hole 12 to form a joint portion 15. Such a structure prevents dislodging of the cylindrical member 14 in a direction opposite to the insertion direction thereof.

First annular joining grooves 14c and second joining annular grooves 14d, each of which have a cross section of a W-shape, are formed on an outer circumference of a cylindrical portion 14b and on an outer circumference of the flange portion 14a, respectively. The first annular joining grooves 14c permit a material of an upper opening peripheral edge portion 11b of the mounting pedestal 11 to undergo plastic deformation locally. The second annular joining grooves 14d permit a material of a lower opening peripheral edge portion 11C of the mounting pedestal 11 to undergo the plastic deformation locally. Thus, the joining in an axial direction is maintained.

In this way, the cylindrical member 14 is joined hermetically with the mounting pedestal 11 by the plastic deformation and with the elastic deformation pressure produced at the joint portion 15a, with a forward end face 14e of the flange portion 14a facing a bottom face 11d of the mounting pedestal 11.

Next, a joining method is described.

First, the cylindrical member 14 is inserted from the side of the insertion hole 11a of the mounting pedestal 11 (from below in FIG. 4). The flange portion 14a is fitted into the countersunk hole 12 to be mounted thereon. While maintaining that state, a welding force is applied to the cylindrical member 14 in an axial direction, causing the forward end face 14e of the flange portion 14a, which has a rough surface, to cut into the bottom face 11d of the mounting pedestal 11, to thereby provide intimate joining in the axial direction.

While maintaining the state in which the forward end face 14e of the flange portion 14a, which has a rough surface, is cut into the bottom face 11d of the mounting pedestal 11, a joining punch (not shown) is lowered concentrically with the mounting pedestal 11 along the insertion hole 11a for inserting the cylindrical member 14. By lowering the joining punch, the plastic deformation is effected locally in the material of the lower opening peripheral edge portion 11c in a direction perpendicular to the pressing direction, thereby ensuring the hermetical joining in the axial direction.

After that, while maintaining the state in which the plastic deformation is effected locally in the material of the lower opening peripheral edge portion 11c in a direction perpendicular to the pressing direction to thereby maintain the hermetical joining, a joining punch (not shown) is lowered concentrically with the cylindrical member 14 along the cylindrical portion 14b to vertically press the upper opening peripheral edge portion 11b of the mounting pedestal 11. The plastic deformation is effected locally in the material of the upper opening peripheral edge portion 11b in a direction perpendicular to the pressing direction, thereby maintaining the joining in the axial direction. In this way, the joint portion is completely hermetically sealed by the plastic deformation and the elastic deformation pressure, maintaining hermeticity of the device.

Third Embodiment

In a hermetical joint structure according to a third embodiment of the present invention, annular joining protrusions or conical joining protrusions are formed to further enhance hermeticity.

The countersunk hole 12 forms a dead end with respect to the insertion hole 11a for the cylindrical member 14 and with respect to a pressure introduction hole 14f. Therefore, the hermeticity is sufficiently maintained even if the forward end face 14e of the flange portion 14a is a rough surface. In addition, the hermeticity can obviously be enhanced by forming annular joining protrusions or conical joining protrusion like the embodiment described above.

What is claimed is:

1. A pressure vessel comprising:
   a pair of members made of different materials and fitted together, said pair of members including:
     a first one of said pair of members defining an outer cylinder of the pressure vessel and having a joining face; and
     a cup-shaped second one of said pair of members having a closed end and a joining face;
   wherein said first one of said pair of members is made of a plastically deformable metal material;
   wherein said second one of said pair of members is made of a material having a greater hardness than said plastically deformable metal material of said first one of said pair of members, said second one of said pair of members having an annular protrusion on an axial end surface portion of said joining face of said second one of said pair of members, and having an annular groove on an outer circumferential surface portion of said joining face of said second one of said pair of members;

wherein said pair of members are fitted together such that:
said annular protrusion of said second one of said pair of members bites into said joining face of said first one of said pair of members so as to be held by elastic deformation pressure of said first one of said pair of members; and said plastically deformable metal material of said first one of said pair of members extends into said annular groove of said second one of said pair of members so as to hold said second one of said pair of members by the elastic deformation pressure.

2. A pressure vessel according to claim 1, wherein said second one of said pair of members is a pressure sensor element made of one of a crystalline material and an amorphous material.

3. A pressure vessel according to claim 1, wherein said joining face of said first one of said pair of members is formed with an extension which fits into said second one of said pair of members.

4. A pressure vessel according to claim 3, wherein said pair of members is shaped so as to be held together by elastic deformation pressure.

5. A pressure vessel according to claim 1, wherein said annular protrusion of said second one of said pair of members is located adjacent to an inner circumferential surface of said first one of said pair of members, on said axial end surface portion of said joining of said second one of said pair of members.

6. A pressure vessel according to claim 1, wherein said second one of said pair of members has at least one additional protrusion on said axial end surface portion of said joining face of said second one of said pair of members, all of said annular protrusions extending into said first member of said pair of members.

7. A pressure vessel according to claim 1, wherein said annular groove of said second one of said pair of members has at least one additional grooves on said outer circumferential surface portion of said joining face of said second one of said pair of members, said plastically deformable metal material of said first one of said pair of members extending into said annular grooves.

8. A pressure vessel according to claim 1, wherein said annular protrusion extends in a direction parallel to a center longitudinal axis of said first one of said pair of members and said second one of said pair of members.

9. A pressure vessel according to claim 1, wherein said annular protrusion has a height in a range of 0.1 mm to 0.15 mm, and a tilt angle in a range of 60° to 90°.

10. A joint structure of a pressure vessel, comprising:
a pair of members made of different materials and to be fitted together, said pair of members including:
a first one of said pair of members defining an outer cylinder of the pressure vessel and having a joining face; and
a cup-shaped second one of said pair of members having a closed end and a joining face;
wherein said first one of said pair of members is made of a plastically deformable metal material;
wherein said second one of said pair of members is made of a material having a greater hardness than said plastically deformable metal material of said first one of said pair of members, said second one of said pair of members having an annular protrusion on an axial end surface portion of said joining face of said second one of said pair of members, and having an annular groove on an outer circumferential surface portion of said joining face of said second one of said pair of members;

wherein said pair of members are shaped and arranged to be fitted together such that:
said annular protrusion of said second one of said pair of members is formed to bite into said joining face of said first one of said pair of members so as to be held by elastic deformation pressure of said first one of said pair of members; and said plastically deformable metal material of said first one of said pair of members is formed to extend into said annular groove of said second one of said pair of members so as to hold said second one of said pair of members by the elastic deformation pressure.

11. A joint structure of a pressure vessel according to claim 10, wherein said annular groove of said second one of said pair of members has at least one additional protrusion on said outer circumferential surface portion of said joining face of said second one of said pair of members, said plastically deformable metal material of said first one of said pair of members being formed to extend into said annular grooves.

12. A joint structure of a pressure vessel according to claim 10, wherein said second one of said pair of members has at least one additional protrusion said axial end surface portion of said joining face of said second one of said pair of members all of said annular protrusions being formed to extend into said first one of said pair of members.

13. A joint structure according to claim 10, wherein said annular protrusion extends in a direction parallel to a center longitudinal axis of said first one of said pair of members and said second one of said pair of members.

14. A joint structure according to claim 10, wherein said annular protrusion has a height in a range of 0.1 mm to 0.15 mm, and a tilt angle in a range of 60° to 90°.

15. A pressure vessel comprising:
a pair of members made of different materials and fitted together, said pair of members including:
a cup-shaped first one of said pair of members having a closed end and a joining face; and
a second one of said pair of members defining an outer cylinder of the pressure vessel and having a joining face;
wherein said first one of said pair of members is made of a plastically deformable metal material;
wherein said second one of said pair of members is made of a material having a greater hardness than said plastically deformable metal material of said first one of said pair of members, said second one of said pair of members having an annular protrusion on an axial end surface portion of said joining face of said second one of said pair of members, and having an annular groove on an inner circumferential surface portion of said joining face of said second one of said pair of members;

wherein said pair of members are fitted together such that:
said annular protrusion of said second one of said pair of members bites into said joining face of said first one of said pair of members so as to be held by elastic deformation pressure of said first one of said pair of members; and said plastically deformable metal material of said first one of said pair of members extends into said annular groove of said second one of said pair of members so as to hold said second one of said pair of members by the elastic deformation pressure.

16. A pressure vessel according to claim 15, wherein said second one of said pair of members is made of one of a crystalline material and an amorphous material.

17. A pressure vessel according to claim 15, wherein said joining face of said first one of said pair of members is formed with an extension which fits into said second one of said pair of members.

18. A pressure vessel according to claim 17, wherein said pair of members is shaped so as to be held together by elastic deformation pressure.

19. A pressure vessel according to claim 15, wherein said annular protrusion of said second one of said pair of members is located adjacent to an inner circumferential surface of said first one of said pair of members, on said axial end surface portion of said joining face of said second one of said pair of members.

20. A pressure vessel according to claim 15, wherein said second one of said pair of members has at least one additional protrusion on said axial end surface portion of said joining face of said second one of said pair of members, all of said annular protrusions extending into said first member of said pair of members.

21. A pressure vessel according to claim 15, wherein said annular groove of said second one of said pair of members has at least one additional protrusion on said inner circumferential surface portion of said joining face of said second one of said pair of members, said plastically deformable metal material of said first one of said pair of members extending into said annular grooves.

22. A pressure vessel according to claim 15, wherein said annular protrusion extends in a direction parallel to a center longitudinal axis of said first one of said pair of members and said second one of said pair of members.

23. A pressure vessel according to claim 15, wherein said annular protrusion has a height in a range of 0.1 mm to 0.15 mm, and a tilt angle in a range of 60° to 90°.

24. A joint structure of a pressure vessel, comprising:
   a pair of members made of different materials and to be fitted together, said pair of members including:
      a cup-shaped first one of said pair of members having a closed end and a joining face; and
      a second one of said pair of members defining an outer cylinder of the pressure vessel and having a joining face;
   wherein said first one of said pair of members is made of a plastically deformable metal material;
   wherein said second one of said pair of members is made of a material having a greater hardness than said plastically deformable metal material of said first one of said pair of members, said second one of said pair of members having an annular protrusion on an axial end surface portion of said joining face of said second one of said pair of members, and having an annular groove on an inner circumferential surface portion of said joining face of said second one of said pair of members;
   wherein said pair of members are shaped and arranged to be fitted together such that:
      said annular protrusion of said second one of said pair of members is formed to bite into said joining face of said first one of said pair of members so as to be held by elastic deformation pressure of said first one of said pair of members; and
      said plastically deformable metal material of said first one of said pair of members is formed to extend into said annular groove of said second one of said pair of members so as to hold said second one of said pair of members by the elastic deformation pressure.

25. A joint structure of a pressure vessel according to claim 24, wherein said annular groove of said second one of said pair of members has at least one additional protrusion on said inner circumferential surface portion of said joining face of said second one of said pair of members, said plastically deformable metal material of said first one of said pair of members being formed to extend into said annular grooves.

26. A joint structure of a pressure vessel according to claim 24, wherein said second one of said pair of members has at least one additional protrusion on said axial end surface portion of said joining face of said second one of said pair of members, all of said annular protrusions being formed to extend into said first one of said pair of members.

27. A joint structure according to claim 24, wherein said annular protrusion extends in a direction parallel to a center longitudinal axis of said first one of said pair of members and said second one of said pair of members.

28. A joint structure according to claim 24, wherein said annular protrusion has a height in a range of 0.1 mm to 0.15 mm, and a tilt angle in a range of 60° to 90°.

* * * * *